(12) United States Patent
Hilpert

(10) Patent No.: US 12,274,238 B2
(45) Date of Patent: Apr. 15, 2025

(54) FEMALE PART OF AN ANIMAL IDENTIFICATION DEVICE, AND CORRESPONDING ACCESSORY AND ANIMAL IDENTIFICATION METHOD

(71) Applicant: Allflex Europe, Vitré (FR)

(72) Inventor: Jean-Jacques Hilpert, Vitré (FR)

(73) Assignee: Allflex Europe, Vitre (FR)

( * ) Notice: Subject to any disclaimer, the term of this patent is extended or adjusted under 35 U.S.C. 154(b) by 0 days.

(21) Appl. No.: 18/489,366

(22) Filed: Oct. 18, 2023

(65) Prior Publication Data
US 2024/0040997 A1 Feb. 8, 2024

Related U.S. Application Data

(63) Continuation of application No. 17/261,353, filed as application No. PCT/EP2019/069395 on Jul. 18, 2019, now Pat. No. 11,839,197.

(30) Foreign Application Priority Data

Jul. 19, 2018 (FR) ...................................... 1856713

(51) Int. Cl.
*A01K 11/00* (2006.01)
(52) U.S. Cl.
CPC .................................. *A01K 11/001* (2013.01)
(58) Field of Classification Search
None
See application file for complete search history.

(56) References Cited

U.S. PATENT DOCUMENTS

| | | | |
|---|---|---|---|
| 3,595,201 A * | 7/1971 | Oudenhoven | G09F 3/12 D30/155 |
| 4,059,074 A * | 11/1977 | Furer | A01K 11/001 119/655 |
| 4,271,999 A * | 6/1981 | Stravitz | G10G 5/00 24/666 |
| 4,581,834 A | 4/1986 | Zatkos et al. | |
| 4,635,389 A | 1/1987 | Oudelette | |
| 4,694,781 A | 9/1987 | Howe et al. | |
| 4,721,064 A * | 1/1988 | Denk | A01K 11/001 119/655 |
| 4,782,613 A | 11/1988 | Guiler et al. | |

(Continued)

FOREIGN PATENT DOCUMENTS

| | | |
|---|---|---|
| CN | 201759960 U | 3/2011 |
| CN | 201967479 U | 9/2011 |

(Continued)

OTHER PUBLICATIONS

French Search Report and Written Opinion dated Mar. 18, 2019 for corresponding French Application No. FR1856713.

(Continued)

*Primary Examiner* — Gary C Hoge
(74) *Attorney, Agent, or Firm* — Keith O'Doherty

(57) ABSTRACT

A female part of an animal identification device. The female part includes a head having an inner receiving cavity that can receive a tip of a male part of the identification device. The female part includes at least one element for fixing an accessory to an outer face of the head. The at least one fixing element is in the form of at least one groove.

15 Claims, 5 Drawing Sheets

(56) References Cited

U.S. PATENT DOCUMENTS

| | | | |
|---|---|---|---|
| 5,725,261 A * | 3/1998 | Rahn | A01K 11/001 292/307 R |
| 6,226,845 B1 | 5/2001 | Fink | |
| 8,413,357 B1 | 4/2013 | Hagen et al. | |
| 10,039,263 B2 | 8/2018 | Teychene et al. | |
| 2003/0121188 A1 | 7/2003 | Haar et al. | |
| 2013/0175347 A1 | 7/2013 | Decaluwe et al. | |
| 2013/0211416 A1* | 8/2013 | Teychene | A01K 11/001 606/117 |
| 2013/0247433 A1* | 9/2013 | Le Devehat | A01K 11/004 40/302 |
| 2014/0083368 A1* | 3/2014 | Kellerby | A01K 29/00 119/655 |

FOREIGN PATENT DOCUMENTS

| | | |
|---|---|---|
| CN | 103068222 A | 4/2013 |
| DE | 102012023491 A1 | 6/2014 |
| EP | 1037525 B1 | 4/2003 |
| FR | 2487634 A1 | 2/1982 |
| NL | 7909173 A | 7/1981 |
| WO | 2012013429 A1 | 2/2012 |

OTHER PUBLICATIONS

International Search Report and Written Opinion dated Oct. 2, 2019 for corresponding International Application No. PCT/EP2019/069395, filed Jul. 18, 2019.

International Preliminary Report on Patentability dated Nov. 9, 2020 for corresponding International Application No. PCT/EP2019/069395, filed Jul. 18, 2019.

English translation of the International Written Opinion dated Oct. 2, 2019 for corresponding International Application No. PCT/EP2019/069395, filed Jul. 18, 2019.

English translation of the International Preliminary Report on Patentability dated Nov. 9, 2020 for corresponding International Application No. PCT/EP2019/069395, filed Jul. 18, 2019.

Third Chinese Office Action dated Mar. 30, 2023 for related Chinese Application No. 201980047523.2.

Chinese Search Report dated Jan. 27, 2022 for related Chinese Application No. 2019800475232.

* cited by examiner

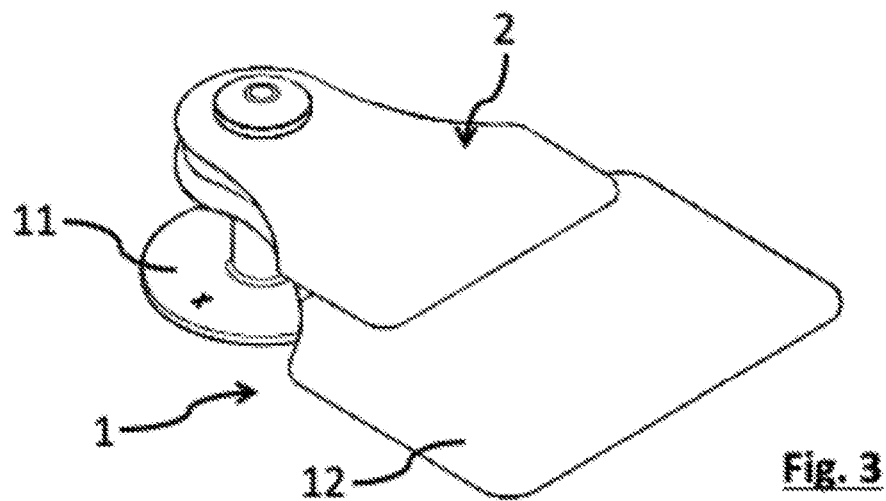
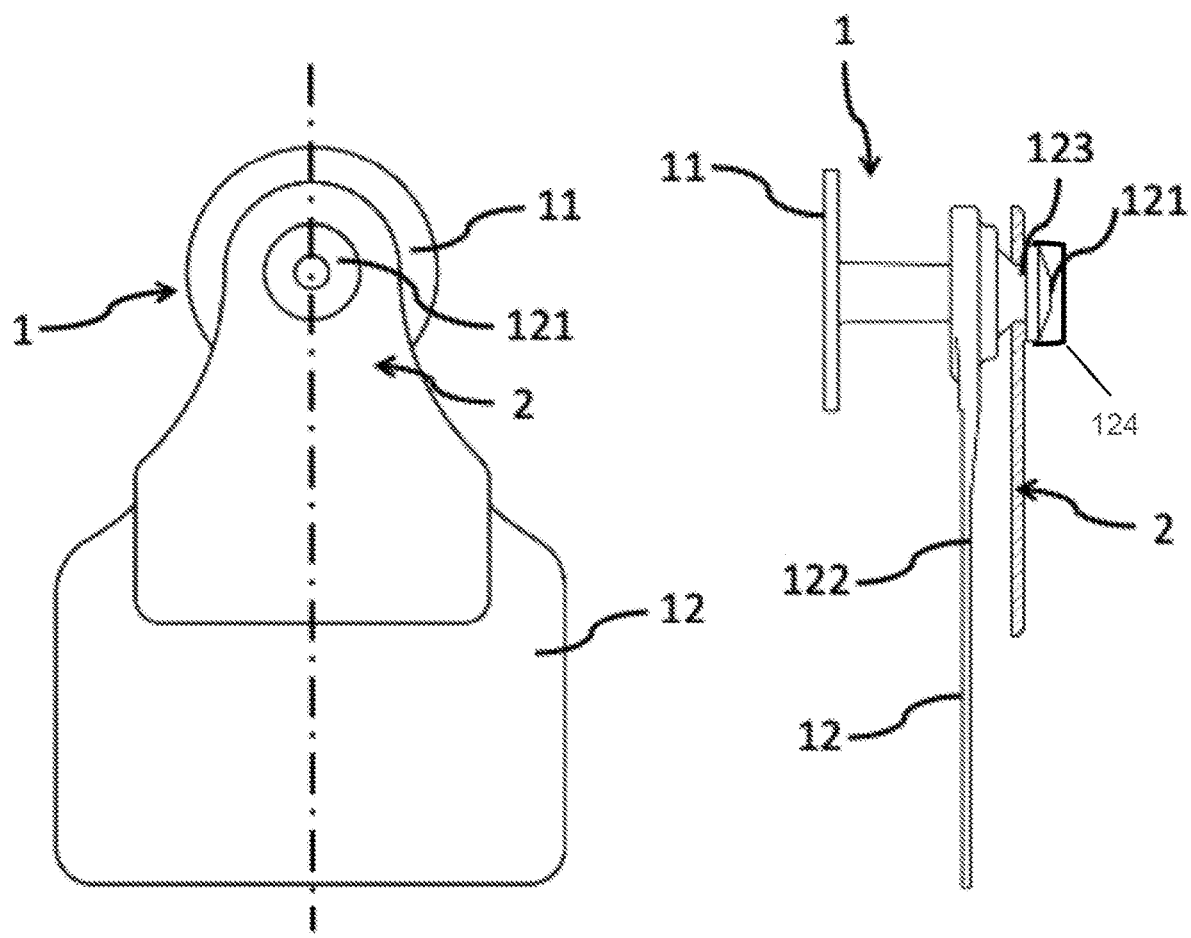
Fig. 3
Fig. 4
Fig. 5

FEMALE PART OF AN ANIMAL IDENTIFICATION DEVICE, AND CORRESPONDING ACCESSORY AND ANIMAL IDENTIFICATION METHOD

1 CROSS REFERENCE TO RELATED APPLICATIONS

This application is a continuation of U.S. application Ser. No. 17/261,353, filed Jan. 19, 2021, which is a Section 371 U.S. National Stage Application of International Application No. PCT/EP2019/069395, filed Jul. 18, 2019, and published as WO 2020/016369 A1 on Jan. 23, 2020, not in English, the contents of which are incorporated herein by reference in their entireties.

2 TECHNICAL FIELD

The field of the invention relates to identifying and marking animals, and more specifically to identification devices or tags.

More precisely, the invention relates to identification devices to which another device can be fixed, referred to as an "accessory", enabling for example the well-being of the animal or the monitoring of the animal to be improved. For example, such an accessory can be a reflector, insecticide tag, surveillance monitor, electronic ID, temperature sensor, etc.

3 TECHNOLOGICAL BACKGROUND

Identification tags for animals have been known for a long time, and are compulsory in many countries, in particular to enable the tracking and certification of origin of animals. This approach can be applied to cattle, sheep, pigs, goats, poultry, and more generally to any species of animal for which tagging is necessary or desirable.

By way of example, European regulation number 1760/2000 requires all cattle to be identified by means of a tag on each of their ears. Said tags need to bear a unique identification number, which enables the identification of the animal, and for example an indication of the farm where it was born.

An identification device generally consists of two parts, a male part and a female part, designed to be assembled in an irreversible manner, for example on the ear of an animal. For this purpose the male part comprises a point, capable of passing through the ear of the animal, and being received in a corresponding receiving cavity arranged in the female part, referred to as a head or cap. Of course, this connection has to be irreversible, to prevent any attempts of fraud, and in particular any modification of the identification number on the animal.

Furthermore, the well-being of animals is a consideration which is becoming more and more important and should not be overlooked. In particular, the comfort and health of the animal are data which need to be monitored and optimised.

To achieve this, it is known to use accessories, such as electronic surveillance monitors, which are integrated into the identification device fixed to the animal.

A disadvantage of this solution is that the accessory integrated into the identification device is hard to access and is in many cases irreplaceable. Another disadvantage of this solution is the fact that only one, or perhaps two, accessories can be integrated into the identification device. Indeed, so as not to irritate the animal and not affect its comfort, the space occupied by the identification device needs to be optimised, which complicates the use of several accessories or accessories of average size in the identification device.

4 SUMMARY

According to at least one embodiment, the proposed technology relates to a female part of an identification device for an animal, the female part comprising a head with an internal receiving cavity capable of receiving a point of a male part of the identification device.

According to the proposed technology, the female part comprises at least one element for fixing an accessory onto an exterior face of the head, the at least one fixing element being in the form of at least one groove.

The proposed solution therefore consists of providing a groove on the head of the female part of an identification device for an animal, so as to enable an additional accessory to be fixed to the identification device.

The proposed solution does not require any significant modification of the identification device. Indeed, only one groove is formed on the exterior face of the head of the female part. A standard male part can therefore be used.

The proposed solution is therefore very simple to implement and manufacture, which also makes it an inexpensive solution.

According to one particular aspect, the head has a substantially cylindrical portion and the groove extends over at least a portion of a circular section of the substantially cylindrical portion.

Thus, according to one embodiment, such a groove extending all around the periphery of the head of the female part can enable the accessory fixed onto the latter to have a degree of freedom. More particularly, a rotation of the accessory around the head of the female part can be permitted in this case, so as to minimise the discomfort of the animal and the risk of injury for example.

According to a particular embodiment, the proposed technology also relates to an accessory configured to cooperate with a female part of an identification device of an animal as described above.

According to the proposed technology, the accessory comprises at least one opening through which the head of the female part is designed to be inserted and complementary fixing means able to cooperate with the at least one groove for joining the accessory to the female part.

Said complementary fixing means, provided on the accessory, are configured to cooperate with the groove arranged on the exterior face of the head of the female part so as to ensure the optimal connection of the accessory to the female part but also to permit, according to at least one particular embodiment, a rotation of the accessory relative to the female part.

According to one particular aspect, the complementary fixing means are in the form of a ring, extending around the edge of the opening, made from a flexible material which is capable of deforming to cooperate with the groove.

In one embodiment, the complementary fixing means formed on the accessory are made from a flexible material such that the accessory is joined to the female part by inserting the accessory by force onto the female part. The accessory is thus fixed securely to the female part of the identification device. The flexible material of the complementary fixing means can also enable the uncoupling of the accessory, for example when the latter needs to be replaced.

Plastic materials can be used such as TPE (thermoplastic elastomers), PU (polyurethanes) or flexible spring steels, such as grab washers, for example.

According to one particular aspect, the complementary fixing means are in the form of a guillotine, which can fit tightly around the head of the female part at the level of the groove.

Such a guillotine, comprising for example a movable plate connected to a retracting spring, enables a user to fix an accessory onto the female part of an identification device in a reversible manner. Such complementary fixing means enables the accessory to be uncoupled, for example when the latter needs to be replaced.

The use of a guillotine on the accessory is a solution that is simple to manufacture and simple to use. Furthermore, such a guillotine ensures the reliable fixing of the accessory onto the female part of the identification device.

According to one particular aspect, the complementary fixing means are in the form of an aperture communicating with the opening, the aperture having a diameter greater than the diameter of the opening so as to form a clip for fixing the accessory onto the female part.

Such an aperture enables the accessory to be connected to the female part by inserting the head of the female part through the aperture then clipping the accessory around the groove, by means of the opening having a diameter smaller than the diameter of the aperture.

The accessory is thus fixed in a simple and reversible manner to the female part of the identification device.

In a particular embodiment, the proposed technique also relates to a system comprising a female part of an identification device of an animal and at least one accessory as described above. Such an accessory is configured to cooperate with the female part of the identification device.

The female part and the accessory have complementary fixing elements/means which ensure a reliable and long-lasting fixing of the accessory onto the female part. These fixing elements/means are simple to use and enable the manufacture of a simple and inexpensive system.

According to one particular aspect, the female part and/or the accessory comprise means for locking the accessory onto the female part.

Thus, in addition to complementary fixing means, the accessory and/or the female part comprise locking means designed to provide optimal securing of the accessory. These locking means are designed to prevent the involuntary removal and/or any attempted fraud or theft of the accessory.

According to one particular aspect, the accessory is fixed in a reversible manner to the female part.

Thus, the replacement of the accessory is possible. The latter is an advantage when the accessory is inexpensive or is a so-called "consumable" item, such as an insecticide tag for example.

According to one particular aspect, the accessory is fixed in an irreversible manner onto the female part.

This has an advantage when the accessory is not meant to be removed from the identification device or when the accessory is expensive, for example an electronic surveillance monitor. The accessory is thus fixed in a secure manner onto the identification device.

According to another embodiment, the proposed technology relates to a method for the identification of an animal comprising successively: placing onto the animal an identification device comprising a male part and a female part as described above and fixing onto the female part at least one accessory as described above.

Such a method for identifying an animal thus comprises placing an identification device onto an animal then fixing at least one accessory onto the female part of the identification device.

Thus the accessory can be fixed onto the identification device at any time, provided that the identification device is applied to the animal. The replacement of the accessory is therefore permitted without requiring any change/replacement of the whole identification device. The use of an additional accessory is therefore greatly simplified by the proposed solution.

According to one particular aspect, fixing at least one accessory onto the female part comprises inserting the accessory by force into the groove of the female part.

Inserting the accessory onto the female part by force enables the latter to be securely connected to the female part of the identification device.

According to another particular aspect, the method also comprises locking at least one accessory onto the female part.

Thus the accessory is fixed in a secure manner onto the female part, so as to prevent any involuntary removal or any attempted fraud or theft of the latter.

5 LIST OF FIGURES

Other features and advantages of the invention are given in the following description of several preferred embodiments, given by way of example and without any limitation, and attached drawings in which:

FIGS. 3 and 4 show respectively a perspective view and a view of the face of the identification device of FIG. 1 onto which an accessory is fixed according to the proposed solution;

FIG. 5 shows a side view of the identification device of FIG. 3 in which the accessory is represented in cross-section along a longitudinal axis;

6 DETAILED DESCRIPTION OF THE INVENTION

Figure 1:
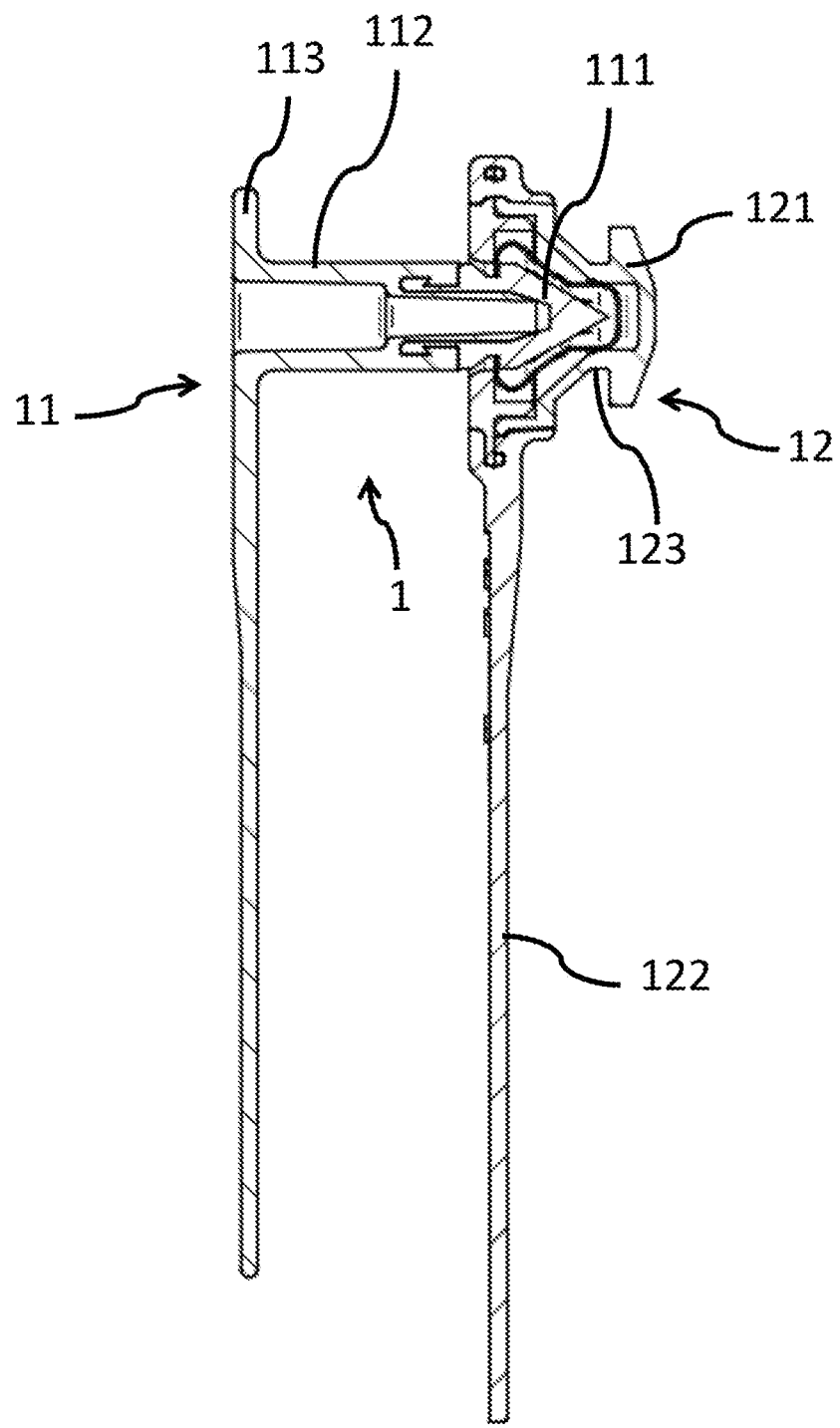
FIG. 1 shows an identification device of an animal in longitudinal cross-section according to one embodiment of the invention.

The general principle of the invention is based on the modification of the female part of an identification device of an animal, enabling in particular one or more accessories to be fixed to the female part.

More specifically, the female part is modified so as to provide on its exterior face, i.e. on its face opposite the male part when the male and female parts are assembled, at least one fixing element for an accessory, having the form of at least one groove.

Owing to the presence of such a groove on the exterior face of the female part, it is possible in particular to fix an accessory onto the female part after placing the identification device onto the animal.

In the following, a particular embodiment is described according to which the female part belongs to a "2-piece" identification device, according to which the male and female parts are detached prior to placing the identification device onto the animal. For example, the identification device is in the form of a loop designed in particular for sheep.

It should be noted that other female parts can be considered according to the invention, for example a female part belonging to a "1-piece" identification device, according to which the male and female parts are connected by a flexible band before placing the identification device onto the animal.

As illustrated in FIGS. 1 to 5, in particular the identification device 1 for an animal comprises a male part 11 and a female part 12 designed to be joined to one another.

Generally, the male part 11 comprises a point 111, mounted on a shaft 112, extending from a male support 113.

The length of the shaft 112 is selected so as to permit good aeration of the scar formed on the animal during the application of the loop, at the same time limiting the possibility of it getting caught in farming equipment (string, chains, fences, boxes, etc.) or other animals.

The female part 12 comprises a head 121, defining a cavity for receiving the point 111 of the male part 11. Such a head 121 is made for example from a rigid material, for example nylon, so as to ensure the inviolability of the identification device 1.

A female support 122 possibly extends to the base of the head 121, from the other side of the ear relative to the male support 113 when the identification device is fixed onto the animal. Such a support 122 can be formed in a material which is more flexible than the head 121, for example an elastomer, and is used for example as a surface for marking an ID of the animal.

According to one particular embodiment, the female support 122 is overmoulded onto a collar at the base of the head 121, so as to connect the head 121 and the female support 122 and form the female part 12.

Such a female part is described in particular in European patent EP1037525B1 in the name of the same applicant.

The point 111 is designed in particular to pass through the skin of the animal, for example its ear, and to penetrate into the head cavity 121. An adapted clamp enables the necessary force to be applied to ensure the penetration. Once this has been performed, it is no longer possible to uncouple the male part 11 from the female part 12.

According to the proposed technical solution, the head 121 of the female part 12 has at least one element 123 for fixing an accessory 2 onto its exterior face, i.e. onto its face opposite the male part 11 when the male 11 and female parts 12 are assembled.

More precisely, a fixing element 123 is in the form of a groove, or channel.

In the example illustrated in FIGS. 1 to 5, the head 121 has a substantially cylindrical form with a circular portion and the groove 123 extends around the whole of the periphery of the head 121. According to other examples, one or more grooves, forming portions of a circle or concentric circles, can be provided. The groove or grooves can thus be curved.

In one variant, the head 121 has a section that is different from a circle, for example rectangular, triangular or any other. The groove or grooves can thus be rectilinear.

In another variant, the head 121 has a different form than a cylinder, which has a constant or variable section.

It is possible that grooves of different depths can be provided.

Figure 2:
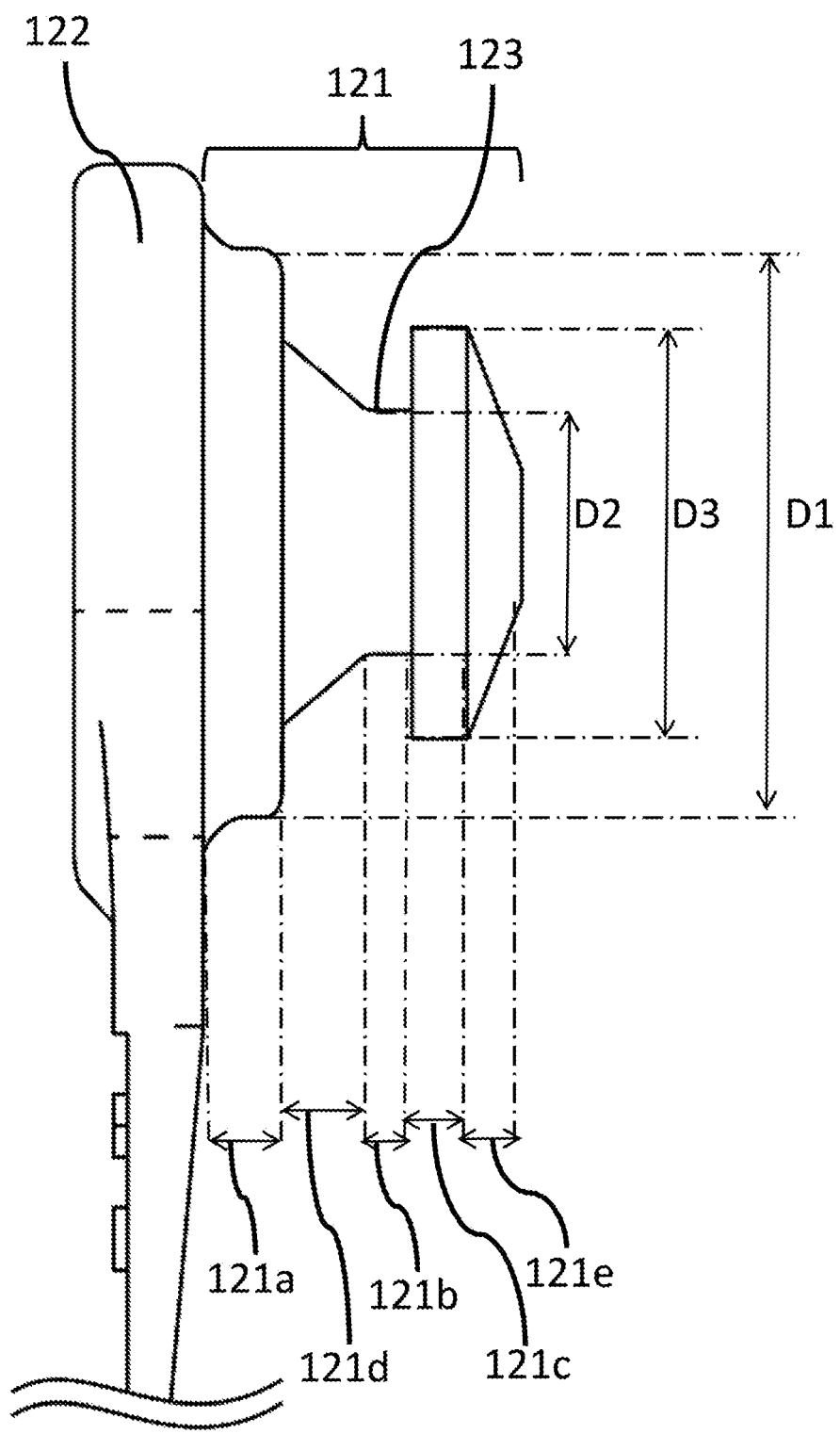
FIG. 2 shows a side view and detailed view of the head of the female part of the identification device according to the proposed technical solution.

In the embodiment illustrated in FIG. 2, the head 121 has three successive portions:
- a first substantially cylindrical portion 121a, possibly overmoulded by the flexible material forming the female support 122, extending substantially in the same axis as the interlocking axis of the male/female parts, and having a first diameter D1 at the level of the junction with the female support 122;
- a second substantially cylindrical portion 121b, located in the extension of the first portion 121a and forming the groove 123, having a second diameter D2, smaller than the first diameter D1; and
- a third substantially cylindrical portion 121c, extending the second portion 121b, and having a third diameter D3 at the level of the junction with the second portion 121b, greater than the second diameter D2.

In one particular embodiment, the third diameter D3 is the same as the first diameter D1.

It is possible that at least one of the portions is in the form of a truncated cone.

In one variant, an intermediate portion 121d in the form of a truncated cone is provided between the first 121a and second 121b portions of the head 121 so as to facilitate the positioning of the accessory 2. Likewise, a final portion 121e can be provided at the end of the third portion 121c, so as to facilitate the application of the accessory 2.

For example, when the female part is as described in European patent EP1037525B1, at least one groove is provided on the exterior of the boss.

An accessory 2 is configured to cooperate with the female part 12 of the identification device 1.

The accessory 2 is for example an accessory which helps to improve the well-being or the surveillance of the animal to which the identification device 1 is fixed. For example, the accessory 2 is a reflector, insecticide tag, additional identifier (visual and/or electronic)—for example specific to the farmer, flash light, temperature sensor, electronic surveillance or monitoring device—enabling in particular the state of health of an animal to be monitored by measuring an activity or a parameter of the animal, etc.

According to the type of accessory, a housing can be provided on the accessory for the purpose of receiving electronic elements for example.

According to at least one embodiment, the female part and its accessory are required to cause the least possible discomfort, and thus to be lightweight and not take up much space. As far as possible the animal should not be able to get injured if the identification device and or the accessory get caught, for example on branches or a fence.

FIGS. 6a to 8b illustrate different examples of means for fixing an accessory to a female part as described above.

As illustrated in FIGS. 6a to 8b, this accessory 2 has complementary fixing means designed to cooperate with the groove or groove(s) 123 of the head 121 so as to connect the accessory 2 to the female part 12 of the identification device 1. Such means enable the accessory 2 to be fixed to the female part 12 in a reversible or irreversible manner.

In particular, if the accessory is a so-called "consumable" accessory such as an insecticide tag, it is desirable to be able to change the accessory regularly when the insecticide is no longer effective, or in case the insecticide tag gets lost. The connection between the accessory and the female part therefore has to be reversible.

If the accessory is a type of surveillance monitor it may be desirable to fix it in an irreversible manner to the female part, as such an accessory is expensive.

Said complementary fixing means comprise at least one opening 21 designed to receive the third portion 121c of the head 121 and to then cooperate with the second portion 121b of the head 121.

Figure 6A:
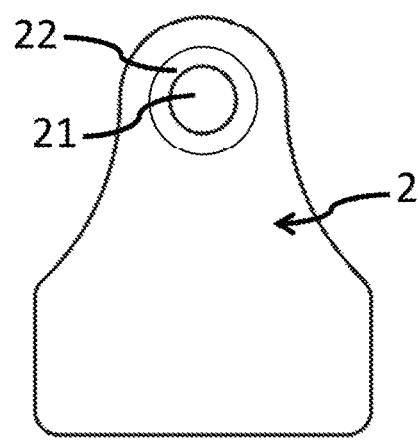
FIGS. 6a and 6b show respectively a detailed view of an accessory according to a first embodiment and a front view of an identification device equipped with such an accessory.
Figure 6B:
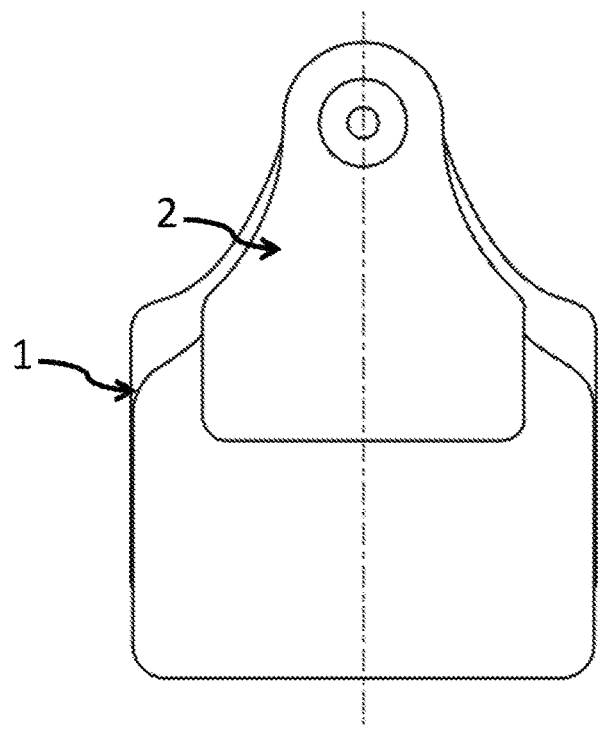

In a first embodiment, illustrated in FIGS. 6a and 6b, the complementary fixing means are in the form of a ring 22 extending around the edge/periphery of the opening 21. Said ring 22 is made/manufactured from a relatively flexible material with a rigidity which is adapted on the one hand to enable the deformation of the opening 21 enabling the insertion of the third portion 121c (and possibly the final portion 121e) of the head 121 through the opening, and on the other hand to ensure the optimal connection of the accessory 2 to the female part 12.

The opening 21 can also have, according to the embodiment, a diameter which is adapted to enable the accessory to pivot/turn around the head 121 of the female part 12. Thus a degree of freedom (rotation) is provided between the accessory 2 and the head 121 of the female part 12 to prevent the animal from getting injured if the loop or the accessory get caught on branches or a fence for example.

In one variant, the whole accessory is made/manufactured from a relatively flexible material.

Figure 7A:
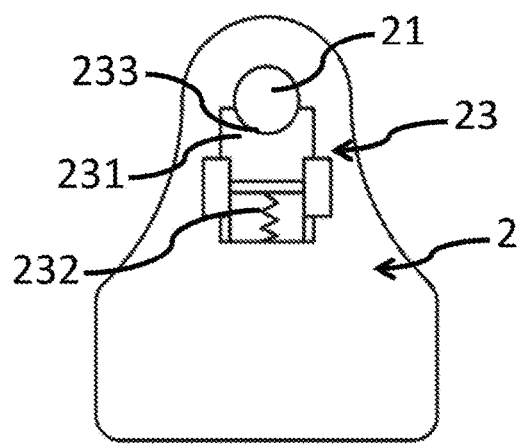
FIGS. 7a and 7b show respectively a view of a face of an accessory according to a second embodiment and a view of a face of an identification device equipped with such an accessory.
Figure 7B:
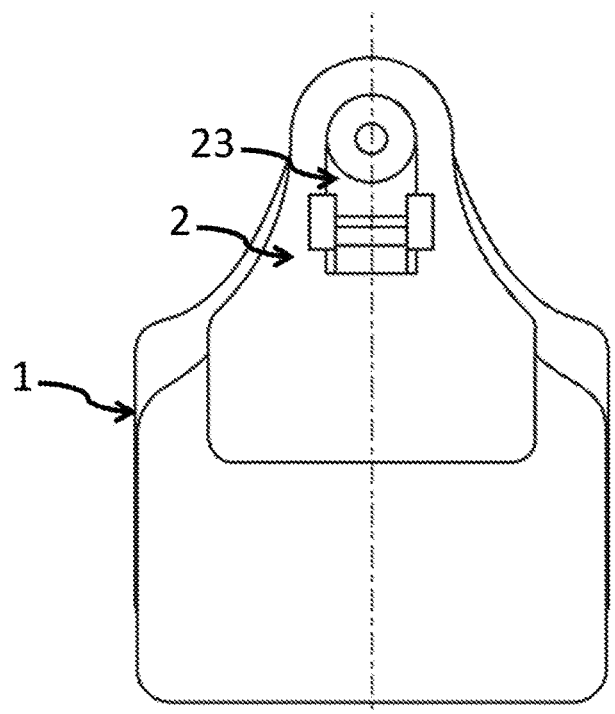

In another embodiment, illustrated in FIGS. 7a and 7b, the complementary fixing means are in the form of a guillotine 23. The guillotine 23 comprises a wall 231 which is movable in translation between a locked position (illustrated in FIG. 7a) and an unlocked position (not illustrated). The movable wall 231 is mounted on an elastic restoring element 232 which in this example is in the form of a spring.

The movable wall 231 also has a notch 233 which is configured to fit tightly around the groove 123 of the female part 12 with the edge of the opening 21 in the locked position of the movable wall 231 and when the accessory cooperates with the female part 12.

To fix the accessory 2 onto the head 121 of the female part 12, it is necessary for the user to manually displace the movable wall 231 towards the unlocked position (downwards according to the orientation of FIG. 7a) in order to free the opening 21, then insert the head 121 of the female part 12 into the opening 21. Once the opening 21 cooperates with the groove 123, it is necessary for the user to release the movable wall 231. The restoring spring 232 thus displaces the movable wall 231 into its locked position.

The guillotine 23 thus enables a simple and reversible connection between the accessory 2 and the female part 12.

Figure 8A:
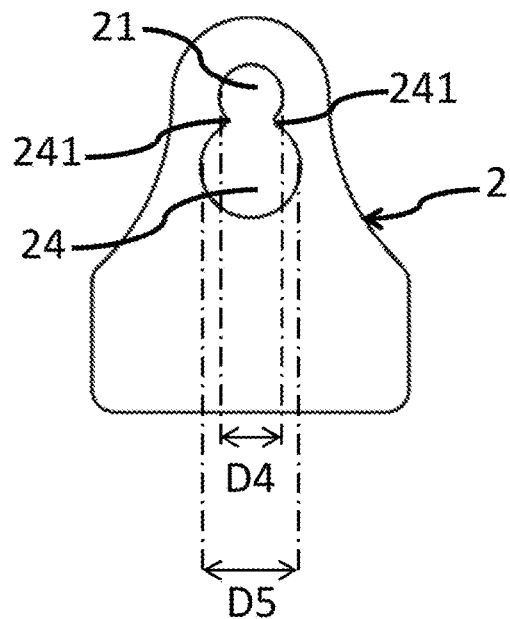
FIGS. 8a and 8b show respectively a detailed view of an accessory according to a third embodiment and a view of face of an identification device equipped with such an accessory.
Figure 8B:
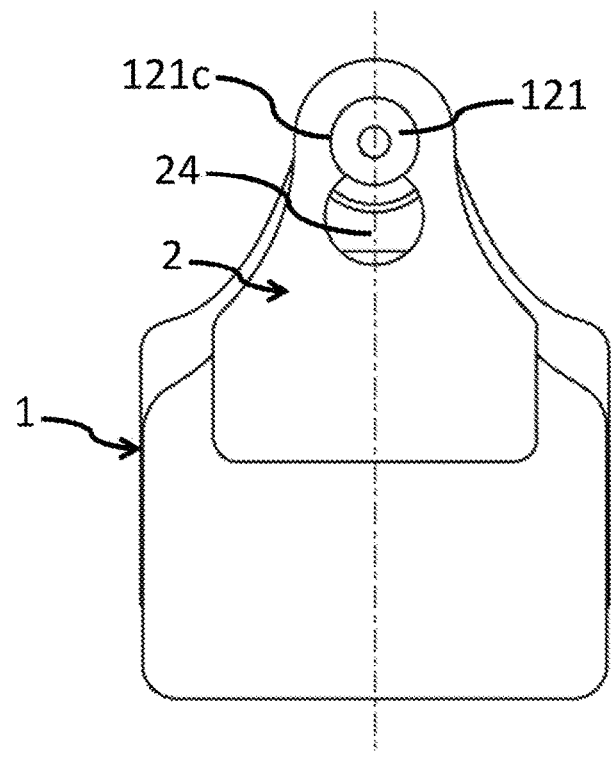

In a further embodiment, illustrated in FIGS. 8a and 8b, the complementary fixing means are in the form of an aperture 24. The aperture 24 has a substantially circular form and communicates with the opening 21. The diameter D5 of the aperture 24 is greater than the diameter D4 of the opening 21.

The intersection between the opening 21 and the aperture 24 forms two lugs 241 located face-to-face which enables the accessory 2 to clip into the groove 123 when the groove 123 cooperates with the opening 21.

More precisely, the aperture 24 is configured to enable the passage of the third portion 121c of the head 121 through the aperture 24. Then, a downwards displacement (according to the orientation of FIG. 8a) enables the groove 123 to pass into the aperture 21 so as to clip on the accessory 2.

Thus the accessory is fixed in a simple and reversible manner onto the female part 12. Therefore, it can be easily removed in order to be replaced.

In one embodiment, optional/additional locking means are provided so as to prevent the accessory 2 from being removed involuntarily or fraudulently from the female part 12.

This may consist for example of a cover 124 which covers the head 121 of the female part 12 at least partly, so as to prevent the accessory 2 from exiting the groove 123. This cover can be slotted by force onto the female part 12. The cover can then only be removed by being broken/smashed. In this case the latter consists of irreversible locking means.

In one variant, the locking means are in the form of a hardenable paste applied onto the accessory 2 and the identification device 1. For example, the paste can comprise two components (in other words the paste is a bicomponent paste) which harden rapidly and enable reliable and solid bond.

In another variant, the locking means are in the form of a locking plate which is configured to be fixed to the identification device 1 and to the accessory 2 by a screw fixing system.

Of course, any other type of locking means can be used which are reversible or irreversible and require or do not require a tool for enabling the locking/unlocking.

Figure 9:
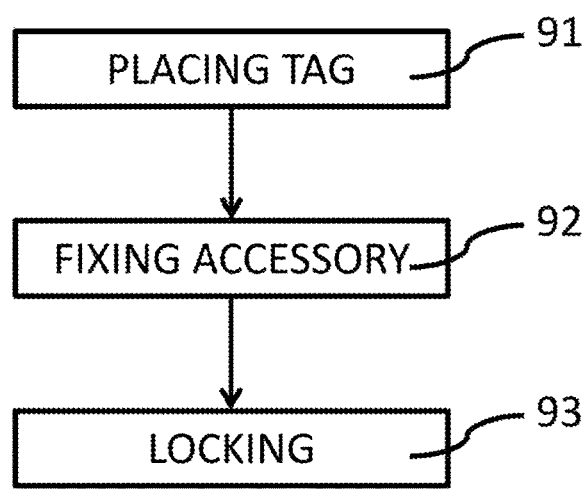
FIG. 9 shows a method for identifying an animal according to the proposed technical solution.

The technical solution proposed also relates to a method for identifying an animal. FIG. 9 illustrates this process schematically.

In a first step (91), an identification device 1 comprising a male part 11 and a female part 12, as described above, is applied to an animal. Conventionally, a clamp is used to join the male part 11 and the female part 12 of the identification device 1 in an irreversible manner.

In a second step (92), then at least one accessory 2 is fixed, as described above, onto the female part 12.

In one particular embodiment described above, the fixing of the accessory 2 onto the female part 12 is achieved by inserting the accessory 2 by force.

Furthermore, and in an optional manner, locking means are then used 93 on the female part 12 and/or the accessory 2 to prevent the removal of the latter.

What is claimed is:

1. A system comprising:
    a female part of an identification device for an animal, said female part comprising
    a head having an internal receiving cavity capable of receiving a tip of a male part of the identification device,
    a support connected to the head, wherein the support comprises a surface for marking an identification of the animal; and
    at least one element for fixing an accessory onto an exterior face of said head, said at least one fixing element being in the form of at least one groove; and
    at least one accessory comprising a first accessory configured to cooperate with said female part, the first accessory comprising a portion having at least one opening through which the head of the female part is designed to be inserted and a complementary fixing element capable of cooperating with said at least one groove for joining said first accessory to said female part;
    wherein said complementary fixing element is in the form of a ring extending around a periphery of said at least one opening, said ring being made from a flexible material which is capable of deforming to cooperate with said at least one groove in said female head.

2. The system according to claim 1, wherein said head has a substantially cylindrical portion and said at least one groove extends over at least a portion of a circular section of said substantially cylindrical portion.

3. The system according to claim 1, wherein said first accessory is fixed in a reversible manner onto said female part.

4. The system according to claim 1, wherein at least one of said female part or said first accessory comprises a lock for locking said first accessory onto said female part.

5. The system according to claim 4, wherein said first accessory is fixed in an irreversible manner onto said female part such that the first accessory can be removed only by breaking the lock.

6. The system according to claim 1, wherein the ring is made of plastic.

7. The system according to claim 6, wherein the ring is made of thermoplastic elastomer or of polyurethan.

8. The system according to claim 1, wherein the whole first accessory is made from the flexible material.

9. The system according to claim 1, wherein the ring is made of flexible spring steel.

10. The system according to claim 1, wherein said at least one opening of the first accessory has a diameter which is adapted to enable the first accessory to pivot around the head of the female part.

11. The system according to claim 1, wherein the female part comprises at least two grooves, including a first groove to cooperate with the complementary fixing element of the first accessory and at least a second groove to cooperate with a complementary fixing element of at least one second accessory, for joining said first and second accessories to said female part.

12. The system according to claim 11, wherein the first groove and the at least one second groove have different depths.

13. The system of claim 1, wherein said support is integrally connected to said head.

14. A method for identifying an animal comprising successively placing onto said animal an identification device comprising:
  a male part; and
  a female part comprising a head having an internal receiving cavity capable of receiving a tip of the male part,
  a support connected to the head, wherein the support comprises a surface for marking an identification of the animal; and
  at least one element for fixing at least one accessory onto an exterior face of said head, said at least one fixing element being in the form of at least one groove; and
  fixing onto said female part a first accessory configured to cooperate with said female part, said first accessory comprising a portion having at least one opening through which the head of the female part is designed to be inserted and a complementary fixing element capable of cooperating with said at least one groove for joining said first accessory to said female part,
  wherein said complementary fixing element is in the form of a ring extending around a periphery of said at least one opening, said ring being made from a flexible material which is capable of deforming to cooperate with said at least one groove, and
  wherein fixing the first accessory onto the female part comprises inserting the first accessory by force into said at least groove of the female part.

15. The method according to claim 14, wherein at least said female part or said accessory comprises a lock for locking said accessory onto said female part, and the method comprises locking said at least one accessory onto said female part with the lock.

\* \* \* \* \*